United States Patent
Paramasivam et al.

(10) Patent No.: US 10,468,731 B2
(45) Date of Patent: Nov. 5, 2019

(54) BATTERY PACK ARRAY FRAMES WITH GROUNDED THERMAL FINS

(71) Applicant: FORD GLOBAL TECHNOLOGIES, LLC, Dearborn, MI (US)

(72) Inventors: Saravanan Paramasivam, South Lyon, MI (US); Steve Droste, Ypsilanti, MI (US); Rajaram Subramanian, Ann Arbor, MI (US); Kimberley King, Northville, MI (US); Mladen Marjanovic, Windsor (CA)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 323 days.

(21) Appl. No.: 15/410,811

(22) Filed: Jan. 20, 2017

(65) Prior Publication Data
US 2018/0212291 A1 Jul. 26, 2018

(51) Int. Cl.
| | | |
|---|---|---|
| *H01M 10/6551* | (2014.01) | |
| *H01M 10/625* | (2014.01) | |
| *H01M 2/10* | (2006.01) | |
| *H01M 10/647* | (2014.01) | |
| *H01M 10/6556* | (2014.01) | |
| *H01M 10/6555* | (2014.01) | |
| *H01M 10/613* | (2014.01) | |
| *H01M 10/04* | (2006.01) | |

(52) U.S. Cl.
CPC ..... *H01M 10/6551* (2015.04); *H01M 2/1077* (2013.01); *H01M 10/613* (2015.04); *H01M 10/625* (2015.04); *H01M 10/647* (2015.04); *H01M 10/6555* (2015.04); *H01M 10/6556* (2015.04); *H01M 10/0481* (2013.01); *H01M 2220/20* (2013.01)

(58) Field of Classification Search
CPC ........... H01M 10/6551; H01M 10/613; H01M 10/655; H01M 10/6556; H01M 10/647; H01M 2/1077; H01M 10/625; H01M 10/0481; H01M 2220/20
See application file for complete search history.

(56) References Cited

U.S. PATENT DOCUMENTS

| | | | |
|---|---|---|---|
| 8,377,581 B2 | 2/2013 | Anderson et al. | |
| 8,574,740 B2 | 11/2013 | Quick et al. | |
| 9,172,122 B2 | 10/2015 | Yum et al. | |
| 9,452,686 B2 | 9/2016 | Yang et al. | |
| 2010/0273042 A1* | 10/2010 | Buck | H01M 2/024 429/120 |
| 2011/0076540 A1* | 3/2011 | Ronning | H01M 10/6563 429/120 |
| 2012/0009455 A1* | 1/2012 | Yoon | H01M 10/653 429/120 |
| 2012/0040223 A1 | 2/2012 | Odumodu | |
| 2012/0107659 A1* | 5/2012 | Phlegm | H01M 10/0413 429/98 |
| 2012/0196168 A1* | 8/2012 | Hirsch | H01M 2/1083 429/99 |
| 2013/0045410 A1 | 2/2013 | Yang et al. | |

(Continued)

*Primary Examiner* — Michael L Dignan
(74) *Attorney, Agent, or Firm* — Carlson, Gaskey & Olds

(57) ABSTRACT

A battery pack includes a support structure, an array frame mounted relative to the support structure, and a thermal fin held within the array frame and grounded to the support structure. The thermal fin may include a grounding extension that is grounded to the support structure.

17 Claims, 5 Drawing Sheets

(56) References Cited

U.S. PATENT DOCUMENTS

| | | | |
|---|---|---|---|
| 2014/0154547 A1* | 6/2014 | Anderson | H01M 10/0413 |
| | | | 429/120 |
| 2014/0246259 A1 | 9/2014 | Yamamura et al. | |
| 2015/0072194 A1 | 3/2015 | Schmieder et al. | |
| 2015/0266387 A1* | 9/2015 | Garfinkel | B60L 11/187 |
| | | | 180/65.1 |
| 2016/0036019 A1* | 2/2016 | Gunna | H01M 10/6551 |
| | | | 429/50 |
| 2016/0197384 A1 | 7/2016 | DeKeuster | |

* cited by examiner

SECTION A-A

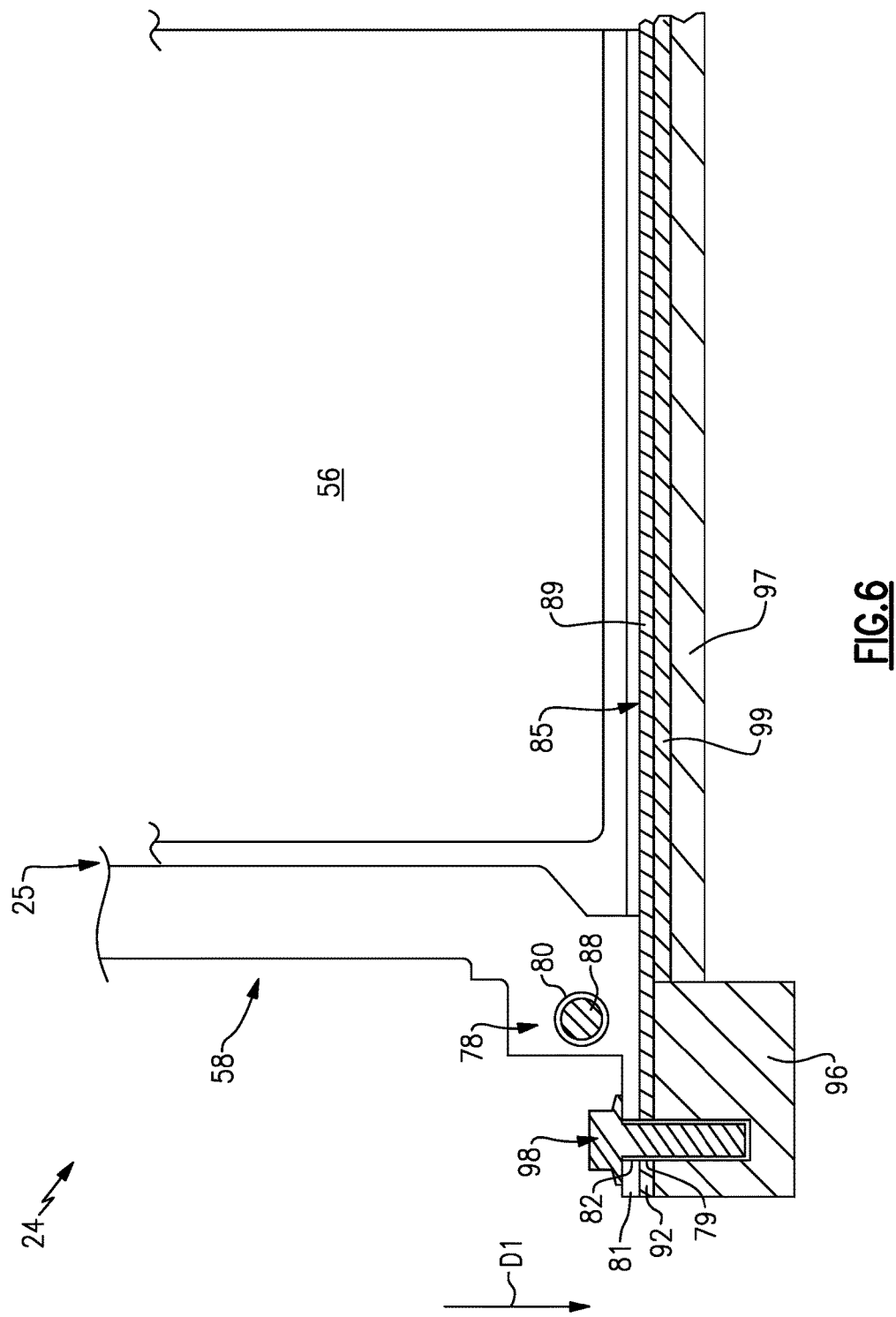

BATTERY PACK ARRAY FRAMES WITH GROUNDED THERMAL FINS

TECHNICAL FIELD

This disclosure relates to battery packs for electrified vehicles. An exemplary battery pack includes an array frame and a thermal fin held within the array frame. The thermal fin is grounded to a support structure of the battery pack.

BACKGROUND

The desire to reduce automotive fuel consumption and emissions is well documented. Therefore, vehicles are being developed that reduce or completely eliminate reliance on internal combustion engines. Electrified vehicles are currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

A high voltage battery pack typically powers the electric machines and other electrical loads of the electrified vehicle. The battery pack includes a plurality of battery cells that store energy for powering these electrical loads. The battery cells are often packaged together in one or more assemblies using various support structures such as frames, spacers, rails, walls, plates, bindings, etc. There is often a limited amount of space available within a vehicle for accommodating the battery pack. Space efficient designs are therefore desirable in this field of technology.

SUMMARY

A battery pack according to an exemplary aspect of the present disclosure includes, among other things, a support structure, an array frame mounted relative to the support structure, and a thermal fin held within the array frame and grounded to the support structure.

In a further non-limiting embodiment of the foregoing battery pack, a battery cell is housed within a pocket of the array frame.

In a further non-limiting embodiment of either of the foregoing battery packs, the support structure is a portion of a tray of an enclosure assembly.

In a further non-limiting embodiment of any of the foregoing battery packs, the support structure is a portion of a heat exchanger plate.

In a further non-limiting embodiment of any of the foregoing battery packs, the thermal fin includes a body and a leg that extends transversely from the body.

In a further non-limiting embodiment of any of the foregoing battery packs, a grounding extension extends from the leg.

In a further non-limiting embodiment of any of the foregoing battery packs, the grounding extension is grounded to the support structure.

In a further non-limiting embodiment of any of the foregoing battery packs, the array frame includes a fastener housing, and a portion of the thermal fin extends between the fastener housing and the support structure.

In a further non-limiting embodiment of any of the foregoing battery packs, the array frame includes a fastener housing having a first opening configured to receive a rod. A mounting foot extends from the fastener housing and includes a second opening configured to receive a fastener.

In a further non-limiting embodiment of any of the foregoing battery packs, a portion of the thermal fin extends beneath the mounting foot.

In a further non-limiting embodiment of any of the foregoing battery packs, the portion includes an opening that receives the fastener.

In a further non-limiting embodiment of any of the foregoing battery packs, the thermal fin is positioned in proximity to a heat exchanger plate.

In a further non-limiting embodiment of any of the foregoing battery packs, a thermal interface material is disposed between the thermal fin and the heat exchanger plate.

In a further non-limiting embodiment of any of the foregoing battery packs, the thermal fin includes a body embedded in the array frame and a first leg and a second leg that extend outside of the array frame.

In a further non-limiting embodiment of any of the foregoing battery packs, a first grounding extension extends from the first leg and a second grounding extension extends from the second leg.

A method according to another exemplary aspect of the present disclosure includes, among other things, positioning an array frame relative to a support structure of a battery pack, and grounding a thermal fin held within the array frame to the support structure.

In a further non-limiting embodiment of the foregoing method, the array frame includes a fastener housing, and positioning the array frame includes inserting a fastener through the fastener housing and into the support structure.

In a further non-limiting embodiment of either of the foregoing methods, the thermal fin includes a grounding extension that is grounded to the support structure.

In a further non-limiting embodiment of any of the foregoing methods, the grounding extension extends between a fastener housing of the array frame and the support structure.

In a further non-limiting embodiment of any of the foregoing methods, the support structure is a portion of a tray or a portion of a heat exchanger plate of the battery pack.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 6 is a cross-sectional view depicting portions of a battery pack.

DETAILED DESCRIPTION

This disclosure details various battery pack designs for use within electrified vehicles. An exemplary battery pack includes an array frame mounted to a support structure. A thermal fin is held within the array frame and is grounded to the support structure. These and other features are discussed in greater detail in the following paragraphs of this detailed description.

Figure 1:
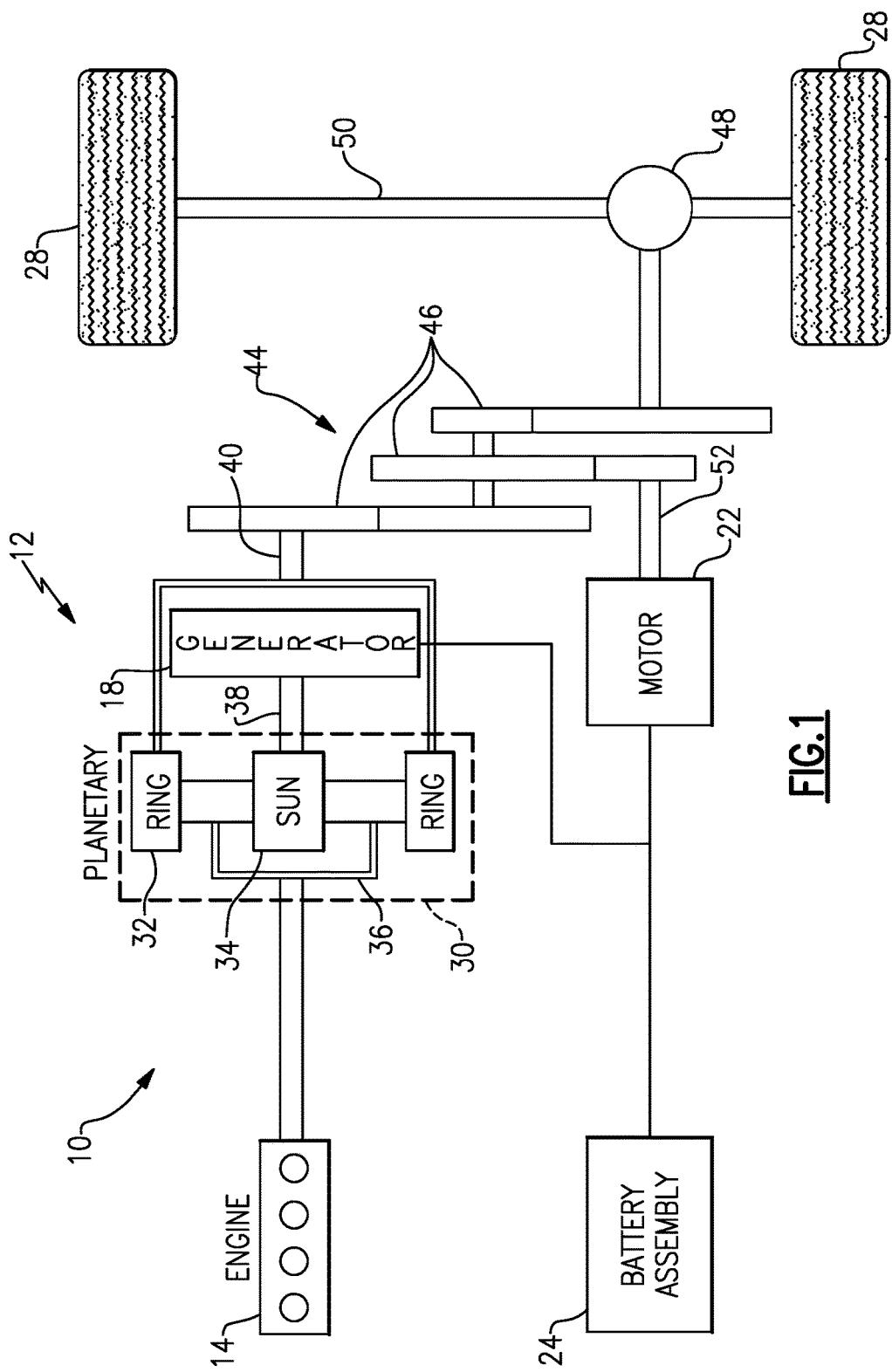
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's), fuel cell vehicles, etc.

In a non-limiting embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices could also be used to electrically power the electrified vehicle 12.

In a non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
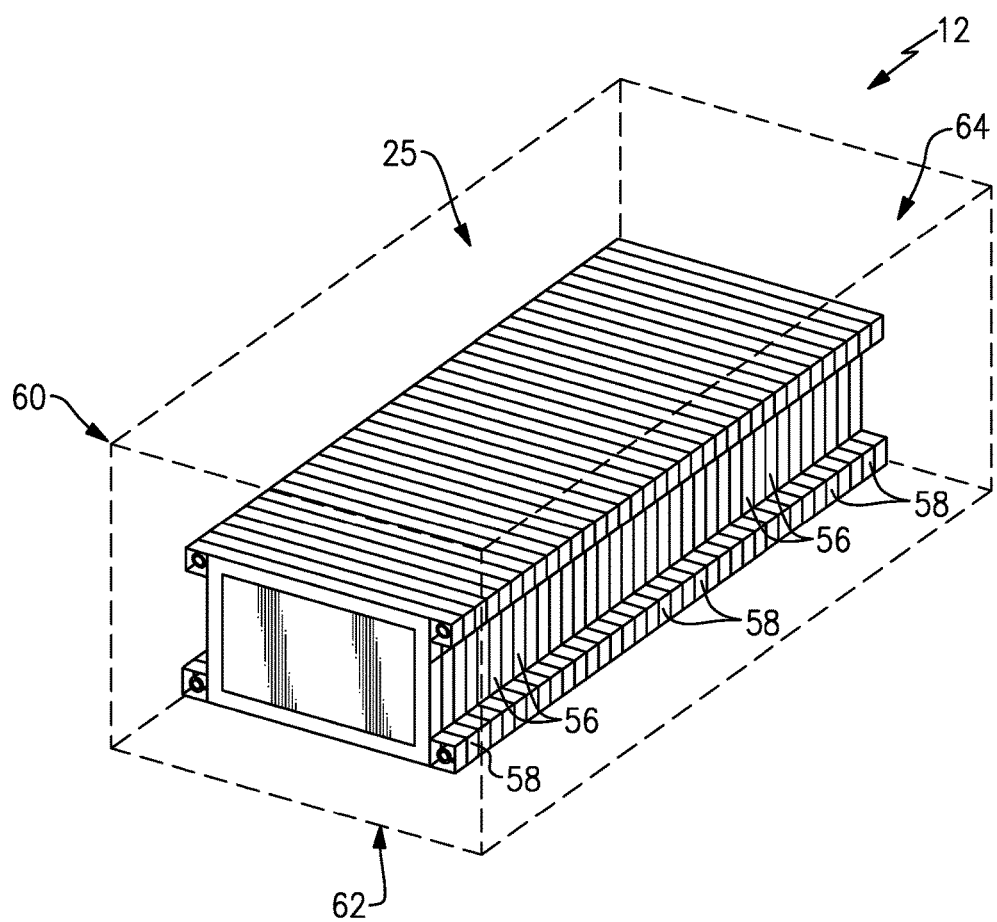
FIG. 2 illustrates a battery pack of an electrified vehicle.

FIG. 2 illustrates a battery pack 24 that can be employed within an electrified vehicle. For example, the battery pack 24 could be part of the electrified vehicle 12 of FIG. 1. FIG. 2 is a perspective view of the battery pack 24, and its external components (e.g., enclosure assembly 60) are shown in phantom to better illustrate the internal components of the battery pack 24.

The battery pack 24 includes a plurality of battery cells 56 that store electrical power for powering various electrical loads of the electrified vehicle 12. Although a specific number of battery cells 56 are depicted in FIG. 2, the battery pack 24 could employ a greater or fewer number of battery cells within the scope of this disclosure. In other words, this disclosure is not limited to the configuration shown in FIG. 2.

The battery cells 56 may be stacked side-by-side to construct a grouping of battery cells 56, sometimes referred to as a "cell stack." The battery pack 24 can include one or more separate groupings of battery cells 56. The battery cells 56 may include any geometry (prismatic, cylindrical, pouch, etc.) and any chemistry (lithium-ion, nickel-metal hydride, lead-acid, etc.).

The battery cells 56, along with any support structures (e.g., frames, spacers, rails, walls, plates, bindings, etc.), may collectively be referred to as a battery assembly 25. The battery cells 56 are retained relative to one another by a plurality of array frames 58. Although the battery pack 24 of FIG. 2 is depicted as having a single battery assembly 25, the battery pack 24 could include a greater number of battery assemblies within the scope of this disclosure. In addition, although depicted as extending longitudinally inside the battery pack 24, the battery assembly 25 could alternatively be arranged to extend laterally or horizontally inside the battery pack 24.

An enclosure assembly 60 houses each battery assembly 25 of the battery pack 24. In a non-limiting embodiment, the enclosure assembly 60 is a sealed enclosure that includes a tray 62 and a cover 64. The cover 64 is secured to the tray 62 to enclose and seal the battery assembly 25 of the battery pack 24.

Figure 3:
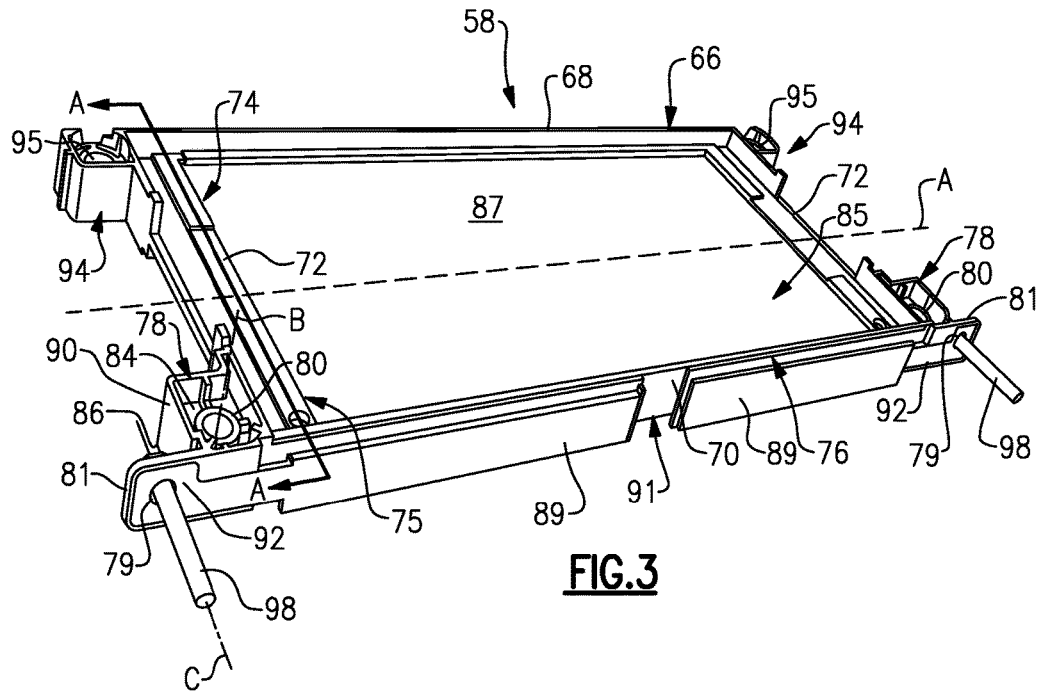
FIGS. 3 and 4 illustrate an exemplary array frame of a battery assembly.
Figure 4:
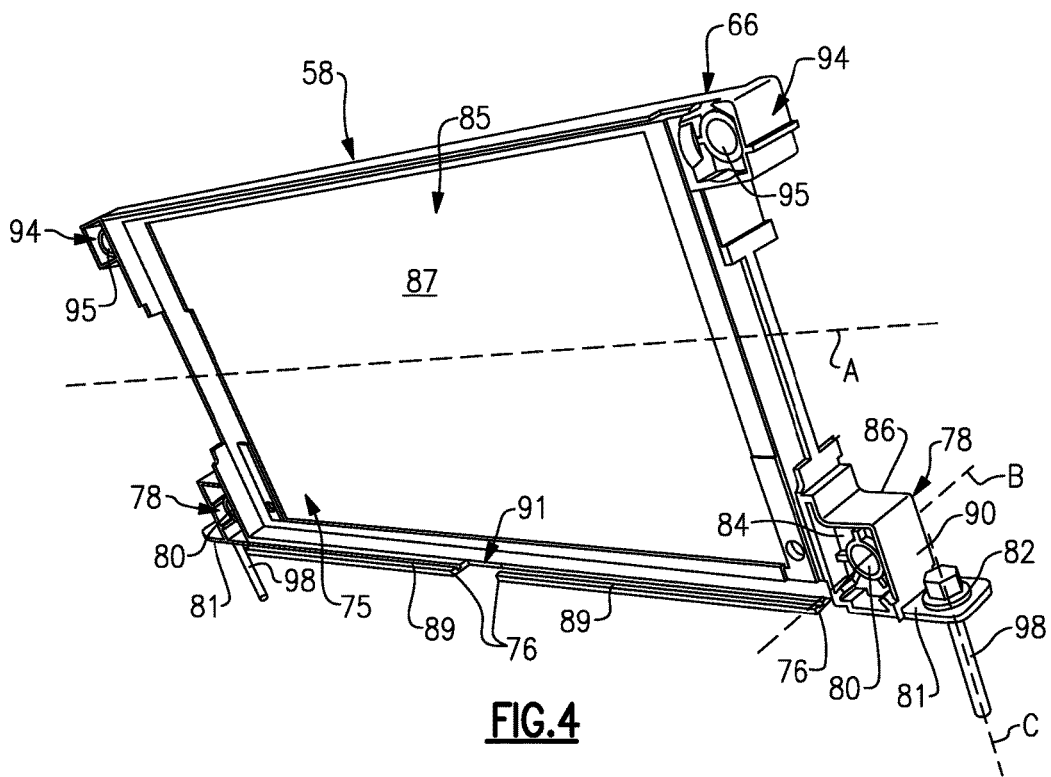
Figure 5:
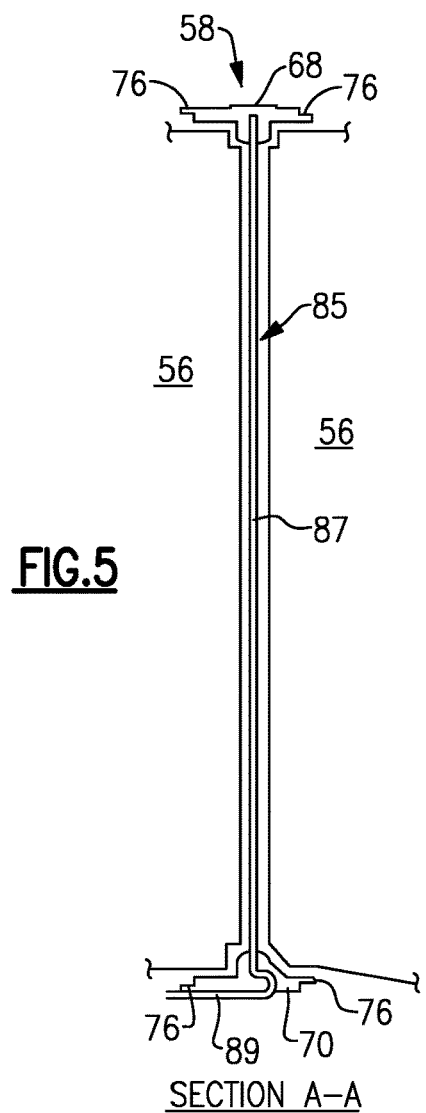
FIG. 5 is a cross-sectional view through section A-A of FIG. 3.

FIGS. 3, 4 and 5 illustrate an exemplary array frame 58 of the battery assembly 25 of FIG. 2. The array frame 58 includes a frame body 66 disposed along a longitudinal axis A. The frame body 66 includes a top wall 68, a bottom wall 70, and frame arms 72 that connect between the top wall 68 and the bottom wall 70. In a non-limiting embodiment, the frame arms 72 are disposed at the longitudinal extents of the top wall 68 and the bottom wall 70. The top wall 68, the bottom wall 70, and the frame arms 72 establish a perimeter around an opening 74 formed through the frame body 66. In a non-limiting embodiment, the top wall 68 and the bottom wall 70 extend horizontally and in parallel with the longitudinal axis A, and the frame arms 72 extend vertically and transverse to the longitudinal axis A.

The frame body 66 of the array frame 58 may be a unitary, plastic structure. In a non-limiting embodiment, the top wall 68, the bottom wall 70, and the frame arms 72 are molded, cast, machined or otherwise manufactured to form the unitary structure.

Each opposing side of the frame body 66 includes a pocket 75. The pockets 75 may be sized and shaped to receive a battery cell (see feature 56 of FIGS. 2 and 5, for example). The array frame 58 may house either one or two battery cells, with each pocket 75 being capable of receiving a single battery cell. In a non-limiting embodiment, the battery cells 56 are pouch cells for a high voltage battery assembly. A non-limiting example of a suitable pouch battery cell is a lithium-ion polymer battery. However, other types of battery cells are also contemplated within the scope of this disclosure.

A plurality of retention features 76 may be integrated into the top wall 68, the bottom wall 70, and/or the frame arms 72 for connecting the array frame 58 to an adjacent array frame. The retention features 76 may engage corresponding retention features of adjacent array frames to build a battery assembly. It should be understood that the battery assemblies of this disclosure are not limited to any specific number of array frames or battery cells.

The array frame 58 may additionally include one or more fastener housings 78. The fastener housings 78 are integrated features of the frame body 66 of the array frame 58. The fastener housings 78 may protrude from the frame arms 72 in a direction away from a center of the frame body 66. In a first non-limiting embodiment, the fastener housings 78 are disposed at a bottom of the frame arms 72 (e.g., near a junction between the frame arms 72 and the bottom wall 70).

Each fastener housing 78 includes a first opening 80. The first opening 80 extends through the fastener housing 78. For example, the first opening 80 may extend along an axis B between opposing side walls 84, 86 of the fastener housing 78. In a non-limiting embodiment, the axis B is perpendicular to the longitudinal axis A. Each first opening 80 is configured to receive a rod 88 (see, e.g., FIG. 6).

The fastener housings 78 may additionally include a mounting foot 81 that extends further away from the center of the frame body 66. In a non-limiting embodiment, each mounting foot 81 protrudes outwardly from an end face 90 of the fastener housing 78. Each mounting foot 81 includes a second opening 82 that extends along an axis C. In a non-limiting embodiment, the axis C is perpendicular to both the longitudinal axis A and the axis B and extends vertically in parallel with the frame arms 72. The second opening 82 is configured to receive a fastener 98 for mounting the array frame 58 to a support structure (see, e.g., FIG. 6).

In another non-limiting embodiment, the array frame 58 includes second fastener housings 94 that protrude from the frame arms 72 at an end opposite from the fastener housings 78 (here, at a junction between the frame arms 72 and the top wall 68). The second fastener housings 94 include a single opening 95 for receiving another rod or fastener. However, in this non-limiting embodiment, the second fastener housings 94 lack additional openings for receiving fasteners for mounting the array frame 58 to a support structure.

A plurality of the array frames 58 may be stacked side-by-side to build a battery assembly 25. In a non-limiting embodiment, only one frame of the grouping of array frames 58 includes the fastener housing 78 having both the first openings 80 and the second opening 82. The remaining array frames 58 could include only the second fastener housings 94 (i.e., are only configured to receive rods 88). It may only be necessary to provide the fastener housings 78 at the locations where the battery assembly 25 needs fastened down.

Other configurations are also contemplated, including configurations in which each array frame 58 of an assembly includes at least one of the fastener housings 78. The total amount and locations of the fastener housings 78 of the battery assembly 25 will depend on many design factors, including but not limited to the overall length of the battery assembly 25.

A thermal fin 85 may be held within the array frame 58. In a non-limiting embodiment, the thermal fin 85 is insert molded or otherwise imbedded within the array frame 58. The thermal fin 85 may be an aluminum thermal fin. However, other materials are additionally contemplated within the scope of this disclosure. The thermal fin 85 separates the battery cells 56 which are received within the pockets 75 of the array frame 58 and may be in contact with side faces of the battery cells 56. A portion of the thermal fin 85 may contact a heat exchanger plate or a thermal interface material (discussed in greater detail below) to dissipate any heat absorbed from the battery cells 56. During certain conditions, the thermal fin 85 may remove heat from the battery cells 56. In other conditions, the thermal fin 85 may add heat to the battery cells 56.

In another non-limiting embodiment, the thermal fin 85 includes a body 87 and one or more legs 89 that extend from the body 87. The body 87 may be positioned within the opening 74 of the array frame 58, whereas the leg(s) 89 extend to a position outside of the array frame 58. The leg(s) 89 of the thermal fin 85 may be oriented transversely to the body 87 and may extend underneath the bottom wall 70 of the array frame 58 (see, e.g., FIG. 5).

In a non-limiting embodiment, the thermal fin 85 includes two legs 89. A gap 91 is situated between the adjacent legs 89 for optionally receiving a retention band or binding.

In yet another non-limiting embodiment, the thermal fin 85 includes one or more grounding extensions 92 (best shown in FIG. 3) for grounding the thermal fin 85 relative to another metallic structure of a battery pack. The grounding extensions 92 extend underneath the fastener housings 78 and the mounting feet 81 of the array frame 58. In this way, when the array frame 58 is mounted to a support structure, the grounding extensions 92 are sandwiched between the array frame 58 and the support structure and thus grounded to the support structure, which is another metallic structure. The grounding extensions 92 may include openings 79 for receiving the fastener 98.

Figure 7:
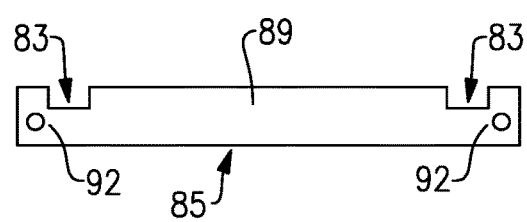
FIG. 7 is a bottom view of a thermal fin equipped with features for grounding the thermal fin to another structure.

In embodiments in which the thermal fin 85 includes two legs 89, one grounding extension 92 extends from an end of each leg 89 (see, e.g., FIG. 3 embodiment). In other embodiments in which the thermal fin 85 includes a single leg 89 (see, e.g., FIG. 7 embodiment), one grounding extension 92 extends from each opposing end portion 83 of the leg 89. Of course, the number of grounding extensions of the thermal fin 85 will depend on the number of fastener housings 78 the array frame 58 is equipped with, among other factors.

FIG. 6 illustrates portions of a battery pack 24 that includes an array frame 58 having at least one fastener housing 78. The array frame 58 may be secured relative to a support structure 96 of the battery pack 24. In a non-limiting embodiment, the support structure 96 is a portion of a tray of an enclosure assembly of the battery pack 24. Alternatively, the support structure 96 could be a part of a heat exchanger plate 97 or any other metallic component of the battery pack 24.

A rod 88 may be inserted through the first opening 80 of the fastener housing 78 to connect the array frame 58 with additional array frames of a battery assembly 25. The rod 88 imparts compression across the battery assembly 25.

In addition, a fastener 98 may be inserted through the second opening 82 of the mounting foot 81 for mounting the array frame 58, and thus the battery assembly 25, to the support structure 96. In a first non-limiting embodiment, the fastener 98 is a shoulder bolt. In a second non-limiting embodiment, the fastener 98 includes a bolt and sleeve assembly. The fastener 98 functions as a compression limiter for retaining the battery assembly 25 to the support structure 96 inside the battery pack 24. In an exemplary, non-limiting embodiment, the fastener 98 may be inserted using a top-down approach. For example, the fastener 98 can be inserted in a direction D1 that extends in a direction from a cover (not shown) of the battery pack 24 toward the support structure 96. The top-down approach simplifies the assembly of the battery pack 24.

The fastener 98 also extends through the opening 79 of the grounding extension 92 of the thermal fin 85. Therefore, once the array frame 58 is mounted, the thermal fin 85 is grounded to the support structure 96 by virtue of its contact with the support structure 96.

In another non-limiting embodiment, the thermal fin 85 may be grounded to a portion of a heat exchanger plate 97. The thermal fin 85 of the array frame 58 may be positioned in proximity to a heat exchanger plate 97, sometimes referred to as a cold plate. The heat exchanger plate 97 is configured to conduct heat out of the battery cells 56. In other words, the heat exchanger plate 97 acts as a heat sink to remove heat from the heat sources (i.e., the battery cells 56) during certain conditions. The heat exchanger plate 97 could alternatively be configured to add heat to the battery cells 56, such as during relatively cold ambient conditions.

A thermal interface material (TIM) 99 may be disposed between the thermal fin 85 and the heat exchanger plate 97. In a non-limiting embodiment, the TIM 99 is disposed between the leg 89 of the thermal fin 85 and the heat exchanger plate 97. The TIM 99 maintains thermal contact between the thermal fin 85 and the heat exchanger plate 97 and increases the thermal conductivity between these neighboring components during heat transfer events. The TIM 99 may be any known thermally conductive material.

The exemplary array frames of this disclosure provide a more efficient packaging density by combining functions (e.g., battery cell retention, mounting, grounding, etc.) traditionally performed by multiple parts into a single, integrated unit. The array frames occupy less volume, reduce the amount of part-to-part clearances that exist inside the battery pack, and improve safety by grounding the thermal fin 85.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
a support structure;
an array frame mounted relative to said support structure; and
a thermal fin held within said array frame and including a grounding extension that is in direct contact with said support structure,
wherein a fastener housing of said array frame includes a first opening, a mounting foot of said array frame extends from said fastener housing and includes a second opening, the grounding extension extends between said mounting foot and said support structure, a rod is received through said first opening, and a fastener is received through said second opening and said grounding extension and into said support structure.

2. The battery pack as recited in claim 1, comprising a battery cell housed within a pocket of said array frame.

3. The battery pack as recited in claim 1, wherein said support structure is a portion of a tray of an enclosure assembly.

4. The battery pack as recited in claim 1, wherein said support structure is a portion of a heat exchanger plate.

5. The battery pack as recited in claim 1, wherein said thermal fin includes a body and a leg that extends transversely from said body.

6. The battery pack as recited in claim 5, wherein said grounding extension extends from said leg.

7. The battery pack as recited in claim 6, wherein said grounding extension is grounded to said support structure.

8. The battery pack as recited in claim 1, wherein said thermal fin is positioned in proximity to a heat exchanger plate.

9. The battery pack as recited in claim 8, comprising a thermal interface material disposed between said thermal fin and said heat exchanger plate.

10. The battery pack as recited in claim 1, wherein said thermal fin includes a body embedded in said array frame and a first leg and a second leg that extend outside of said array frame.

11. The battery pack as recited in claim 10, comprising a first grounding extension that extends from said first leg and a second grounding extension that extends from said second leg.

12. A method, comprising:
positioning an array frame relative to a support structure of a battery pack; and
grounding a thermal fin held within the array frame to the support structure,
wherein grounding the thermal fin includes positioning a grounding extension of the thermal fin in direct contact with the support structure,
wherein a fastener housing of the array frame includes a first opening, a mounting foot of the array frame extends from the fastener housing includes a second opening, the grounding extension extends between the mounting foot and the support structure, a rod is received through the first opening, and a fastener is received through the second opening and the grounding extension and into the support structure.

13. The method as recited in claim 12, wherein the support structure is a portion of a tray or a portion of a heat exchanger plate of the battery pack.

14. The battery pack as recited in claim 1, wherein said thermal fin includes a body and a first leg and a second leg that extend transversely from said body, wherein a gap extends between said first leg and said second leg, and comprising a retention band or binding received within said gap.

15. The battery pack as recited in claim 1, wherein said fastener housing is disposed near a junction between a frame arm and a bottom wall of said array frame.

16. The battery pack as recited in claim 1, wherein said rod extends along a first axis and said fastener extends along a second axis that is perpendicular to said first axis.

17. A battery pack, comprising:
an enclosure assembly including a tray;
an array frame positioned over top of the tray;
a battery cell positioned within a pocket of the array frame;
a fastener housing of the array frame including a first opening;
a mounting foot that extends from the fastener housing including a second opening;
a rod received through the first opening;
a fastener received through the second opening;
a thermal fin including a body that is held within the array frame and a leg that extends to a position outside of the array frame; and
a grounding extension of the thermal fin that extends from the leg and is positioned in direct contact with the tray,
wherein the fastener extends through the fastener housing and the grounding extension and then extends into the tray.

* * * * *